March 27, 1951     W. L. MORRISON, JR     2,546,949
MAGNETIC POWER UNIT POWER TAKE-OFF
Filed Sept. 21, 1949     2 Sheets-Sheet 1
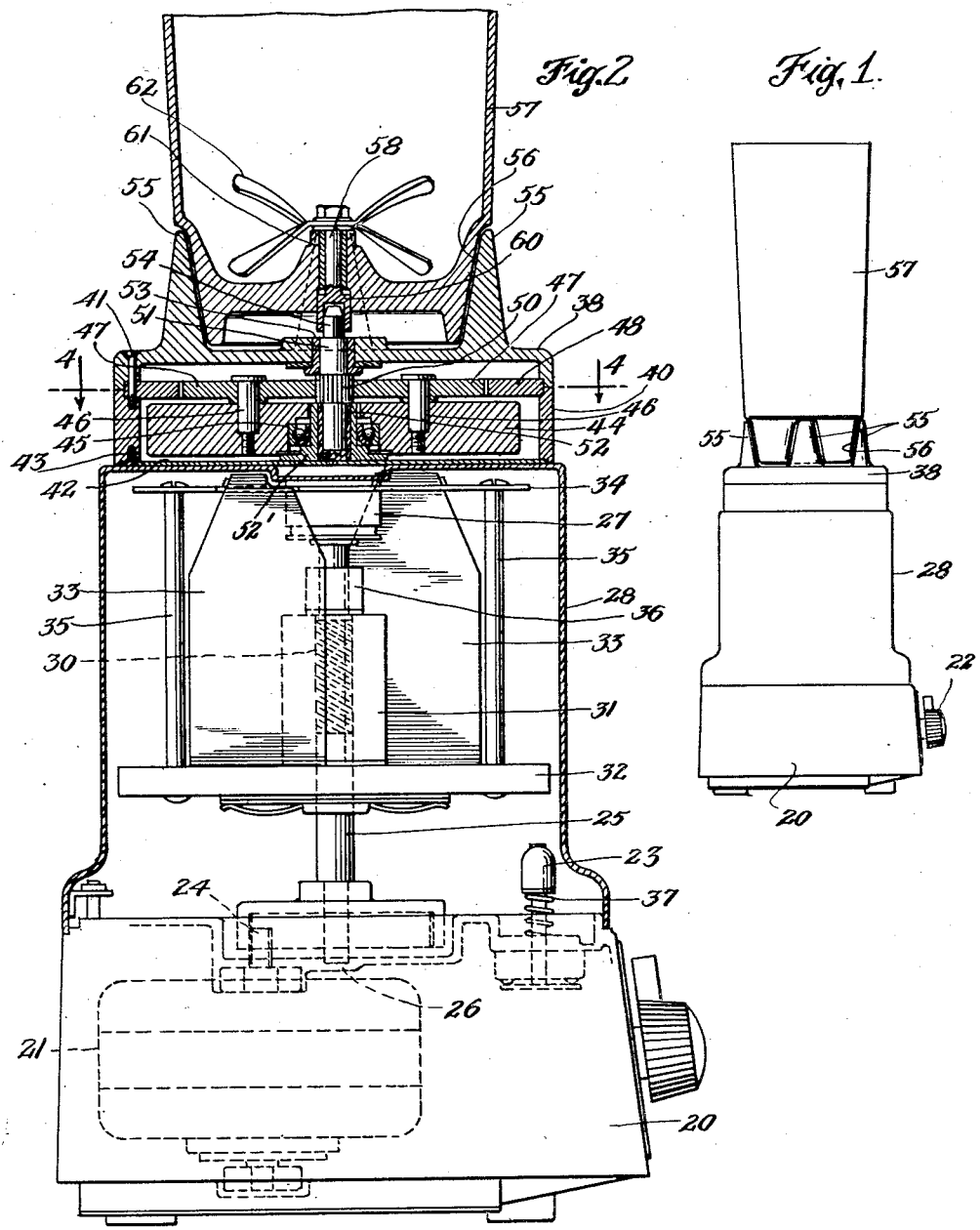
Inventor
WILLARD L. MORRISON JR.
Attorneys March 27, 1951  W. L. MORRISON, JR  2,546,949
MAGNETIC POWER UNIT POWER TAKE-OFF
Filed Sept. 21, 1949  2 Sheets-Sheet 2

Inventor
WILLARD L. MORRISON JR.

By

Attorneys

Patented Mar. 27, 1951

2,546,949

UNITED STATES PATENT OFFICE 2,546,949

MAGNETIC POWER UNIT POWER TAKE-OFF

Willard L. Morrison, Jr., Akron, Ohio, assignor to Magnetic Power, Inc., Wilmington, Del., a corporation of Delaware Application September 21, 1949, Serial No. 116,912

6 Claims. (Cl. 172—284)

1

The present invention relates to magnetic power units and particularly power take-offs therefor.

A purpose of the invention is to increase the speed of power driving from a magnetic power unit to a magnet keeper without creating a condition of unbalance in the power take-off.

A further purpose is to derive power on the same axis as the keeper at a much greater speed than that of the keeper.

A further purpose is to obtain a fully symmetrical power take-off which will not create an off-center torque distribution and therefore will not tend to displace the power take-off to one side due to the magnetic force.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a side elevation of a magnetic power unit and power take-off according to the invention.

Figure 2 is an enlarged fragmentary side elevation partly in central vertical section.

In the drawings like numerals refer to like parts.

Figure 3:
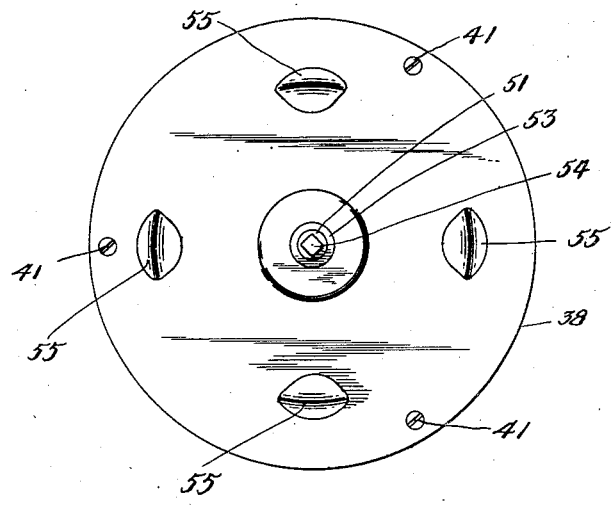
Figure 3 is a top plan view of the power take-off unit with the mixer removed.
Figure 4:
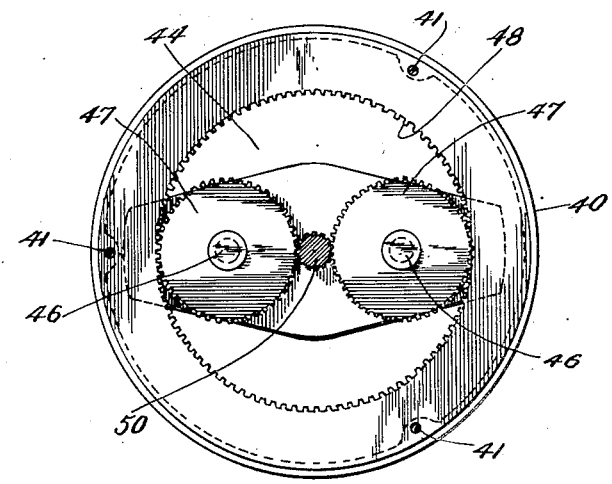
Figure 4 is a section of Figure 2 on the line 4—4.

Magnetic power units, as shown for example in Jerome L. Murray U. S. patent application Serial No. 771,176, filed August 29, 1947, for Mixer and Processor for Home Use and the Like, have been developed for mixing and stirring and to operate household appliances.

For many applications it is desirable to obtain much higher speeds than those readily produced by the magnetic power unit itself. For example, whereas the magnetic power unit may operate at a speed of the order of 1000 R. P. M., for home homogenizers and blenders, it is frequently desirable to obtain speeds of the order of 10,000 R. P. M.

Pivotally mounted on the keeper is one or preferably two oppositely disposed planetary

2 gears. The planetary ears externally intermesh with a ring gear. The question of whether the ring gear and planets intermesh as internal and external gears, bevel gears or end and crown gears is not critical to the present invention, although in the preferred embodiment shown the gears are related as internal and external gears. The ring gear is suitably mounted on a housing, and desirably functions as a stationary gear.

Power is taken off on a driven gear which is desirably coaxial with the keeper and externally intermeshes with the planetary gears.

It will be evident that by this procedure an extremely compact device is produced which has close coupling with the driving magnet and has a minimum of height or axial extent. At the same time the forces of the keeper and of the ultimate shaft or driven member are coaxial so that there is no nonsymmetrical force distribution which would tend to displace the magnetic power take-off from the power unit.

It will, of course, be evident that if necesary the magnetic power take-off can be clamped or otherwise fastened to prevent rotation of its housing.

The magnetic power unit of the invention comprises a base housing 20 supporting a vertical electric motor 21 controlled by a switch 22 and cut off by a switch 23. The motor 21 is connected by gearing 24 with a rotor shaft 25 turning in a bottom bearing 26 in the housing and in a top bearing 27 on the underside of the top of a non-magnetic casing 28 surrounding the rotor and supported on the bottom housing. The rotor shaft 25 has threads 30 in the direction which will raise the rotor when the shaft turns forwardly and the threads 30 engage and freely run with the threads on nut 31 surrounding the rotor shaft. The nut 31 interconnects with the rotor base 32 preferably of magnetically susceptible material which supports upwardly directed permanent magnets 33. At the top of the rotor a non-magnetic plate 34 having an opening to clear the top bearing 27, supports the magnets and is held to the rotor base by studs 35. The rotor is limited in upward motion by a collar 36 on the rotor shaft engaging nut 31 and is limited in downward motion by rotor base 32 engaging cut-off switch 23 against the action of switch compression spring 37. When the rotor is in upper position it creates a turning magnetic field close coupled to the keeper. When the rotor is in the lower position the keeper can be readily removed.

It will be understood that any suitable magnetic power unit creating a turning magnet field may be used.

Resting on the casing 28 is a suitably nonmagnetic power take-off housing 38 conveniently separable at 40 and joined by screws 41. At the bottom the take-off housing is closed by a nonmagnetic wall 42 close coupled to the top of the power unit casing, and joined to the rest of the power take-off housing by screws 43. Close coupled with the bottom wall 42 is a rotatable magnetically susceptible keeper 44, which is rotatably mounted on a bearing 45 supported by the collar 52' on the bottom wall of the power take-off housing. Intermediate between the axis and the housing of the keeper, at one and preferably at diametrically opposite points, are planet gear shafts 46 supporting planet gears 47 which intermesh at the outside with an internal ring gear 48 desirably held by locking it between the separable parts of the power take-off housing. The planets at the inside intermesh with a driven pinion 50 which is secured on a shaft 51 journalled at 52 coaxially with the bearing 45, the bearing 52 of the shaft 51 being supported by a stationary collar 52' united as by spot-welding to the bottom wall of the power take-off casing inside the bearing 45. The shaft 51 is journalled at its upper end in a second bearing 53 and is provided with a square end 54 at the top for interconnection with a unit to be driven.

Where the power take-off is used for homogenizing purposes as in a blender, the power take-off casing is desirably provided with upstanding lugs 55 which interlock at 56 to prevent rotation at the bottom of a homogenizer jar 57 having a shaft 58 provided with a square socket 60 to engage the square end 54 on the shaft 51 and journalled at 61 in the center of the bottom of the jar 57. A suitable beater or impeller 62 is provided on the shaft 58.

In operation, in order to employ the device the magnetic power take-off casing will be mounted on top of the magnetic power unit, with the keeper preferably substantially coaxial with the magnet and the coupling between the magnet and the keeper reduced to a minimum.

Turning the magnet will cause the keeper to turn, and turning the keeper will cause the planetary gears to turn inside the ring gear, thus resulting in turning the driven gear which is coaxial with the keeper. The keeper and its planetary gears are supported by the bearing from above, so that the bearing does not interfere with close coupling between the keeper and the magnet and also so that the magnetic forces can provide slight adjustment of the axis of the keeper within the limits of play of the bearing.

While reference has been made herein to a permanent magnet or magnets supported on a rotor for creating the turning magnetic field, questions of whether the magnetic driving field is created by a permanent magnet, an electromagnet or some combination of the same, or by magnets on a rotor or a magnet which forms the entire rotor are not critical in the present invention, and it will be understood that variations in these features may be employed if desired.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a magnetic power device, a power unit including a turning magnet, a magnet keeper pivotally mounted and turning with the magnet, a stationary ring gear, coaxial with the keeper, a planetary gear inside the ring gear intergeared with the ring gear and pivotally mounted on the keeper on an axis radially displaced from the axis of the keeper, and a driven gear on the axis of the keeper inside the planetary gear and intergeared therewith on the same teeth which intergear with the ring gear.

2. A magnetic power take-off unit comprising a housing, a magnet keeper rotatably mounted in the housing, a stationary ring gear on the housing coaxial with the keeper, a planetary gear pivotally mounted on the keeper on an axis radially displaced from the axis of the keeper and externally intermeshed with the ring gear, a driven gear coaxial with the keeper externally intergeared with the planetary gear on the same teeth which intergear with the ring gear and a driven member connected to the driven gear.

3. In a power take-off for a magnetic power unit, a housing, a vertical shaft in the housing, a bearing in the housing rotatably supporting the upper end of the vertical shaft, a magnet keeper rotatably supported on the lower end of the shaft and adapted to turn in the housing, an internal stationary ring gear on the inside of the housing coaxial with the keeper and above the same, a planetary gear pivotally mounted on the keeper intermediate between the axis and the outside of the keeper and externally intergeared with the ring gear on the same teeth which intergear with the ring gear, a driven member rotatably mounted at the axis of the keeper above the same and a driven gear on the driven member externally meshing with the planetary gear.

4. In a power take-off unit, a housing, a vertical bearing in the housing, a vertical shaft in the bearing extending below the same, a magnet keeper rotatably mounted at the lower end of the vertical shaft, a stationary internal ring gear on the housing above the keeper, a pair of oppositely disposed planet gears pivotally mounted on the keeper on an axis radially displaced from the axis of the keeper and externally intermeshing with the ring gear on the same teeth which intergear with the ring gear, a driven gear coaxial with the keeper intermeshing with both planet gears and a driven member turned by the driven gear.

5. In a magnetic power device, a power unit including a turning magnet, a magnet keeper pivotally mounted and turning with the magnet, a final take-off shaft coaxial with the keeper, a stationary ring gear coaxial with the keeper, a planetary gear inside the ring gear intergeared with the ring gear and pivotally mounted on the keeper on an axis radially displaced from the axis of the keeper and a driven gear on the final take-off shaft inside the planetary gear intergeared with the ring gear, the driven gear turning relatively with respect to the ring gear.

6. In a magnetic power device, a power unit housing including a turning magnet, a power take-off housing separable from the power unit housing, a magnet keeper pivotally mounted in the power take-off housing and turning with the magnet, a stationary ring gear coaxial with the keeper mounted on the power take-off housing, a planetary gear inside the ring gear intergeared with the ring gear and pivotally mounted on the keeper on an axis radially displaced from the axis of the keeper, a driven gear on the axis of the keeper inside the planetary gear and intergeared therewith on the same teeth which intergear with the ring gear and a final power take-off shaft journaled in the power take-off housing and carrying the driven gear.

WILLARD L. MORRISON, Jr.

REFERENCES CITED

The following references are of record in the file of this patent:

FOREIGN PATENTS

| Number | Country | Date |
| --- | --- | --- |
| 9,111 | Great Britain | of 1902 |